US009441688B2

(12) United States Patent
Isenmann et al.

(10) Patent No.: US 9,441,688 B2
(45) Date of Patent: Sep. 13, 2016

(54) BRAKE DISC

(71) Applicant: Daimler AG, Stuttgart (DE)

(72) Inventors: Bernd Isenmann, Weil der Stadt (DE);
Ralph Mayer, Boeblingen (DE);
Niculo Steinrisser, Maennedorf (CH)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/351,758

(22) PCT Filed: Sep. 26, 2012

(86) PCT No.: PCT/EP2012/004024
§ 371 (c)(1),
(2) Date: Apr. 14, 2014

(87) PCT Pub. No.: WO2013/053432
PCT Pub. Date: Apr. 18, 2013

(65) Prior Publication Data
US 2014/0311838 A1    Oct. 23, 2014

(30) Foreign Application Priority Data
Oct. 15, 2011   (DE) .................. 10 2011 116 118

(51) Int. Cl.
*F16D 65/10*    (2006.01)
*F16D 65/12*    (2006.01)
*F16D 65/02*    (2006.01)

(52) U.S. Cl.
CPC ............. *F16D 65/10* (2013.01); *F16D 65/123* (2013.01); *F16D 2065/1316* (2013.01); *Y10T 29/49908* (2015.01); *Y10T 29/49936* (2015.01)

(58) Field of Classification Search
CPC ................. F16D 65/123; F16D 65/10; F16D 2065/1316; F16D 2065/1392; Y10T 29/49908; Y10T 29/49936
USPC ............................ 188/218 XL, 218 A, 218 R
See application file for complete search history.

(56) References Cited

U.S. PATENT DOCUMENTS

| 3,661,235 | A  |   | 5/1972 | Harrison |
| 4,082,171 | A  |   | 4/1978 | Lalin et al. |
| 6,035,978 | A  |   | 3/2000 | Metzen et al. |
| 6,446,765 | B1 | * | 9/2002 | Dabertrand et al. ........ 188/18 A |

(Continued)

FOREIGN PATENT DOCUMENTS

| DE | 20 13 535    | 10/1970 |
| DE | 26 41 443 A1 | 3/1977 |

(Continued)

OTHER PUBLICATIONS

International Search Report (PCT/ISA/220 & PCT/ISA/210) with English translation dated Jan. 7, 2013 (7 pages).

(Continued)

*Primary Examiner* — Thomas J Williams
*Assistant Examiner* — Mariano Sy
(74) *Attorney, Agent, or Firm* — Crowell & Moring LLP

(57) ABSTRACT

A brake disc includes a friction ring and a pot arranged concentrically in an opening of the friction ring. The pot has a pot gearing system with at least one pot tooth space, on which a flap is molded, which projects radially in the direction of a corresponding annular tooth of an annular gearing system of the friction ring and radially overlaps the annular tooth on a first axial end.

6 Claims, 2 Drawing Sheets

(56) References Cited

U.S. PATENT DOCUMENTS

Figure 1:
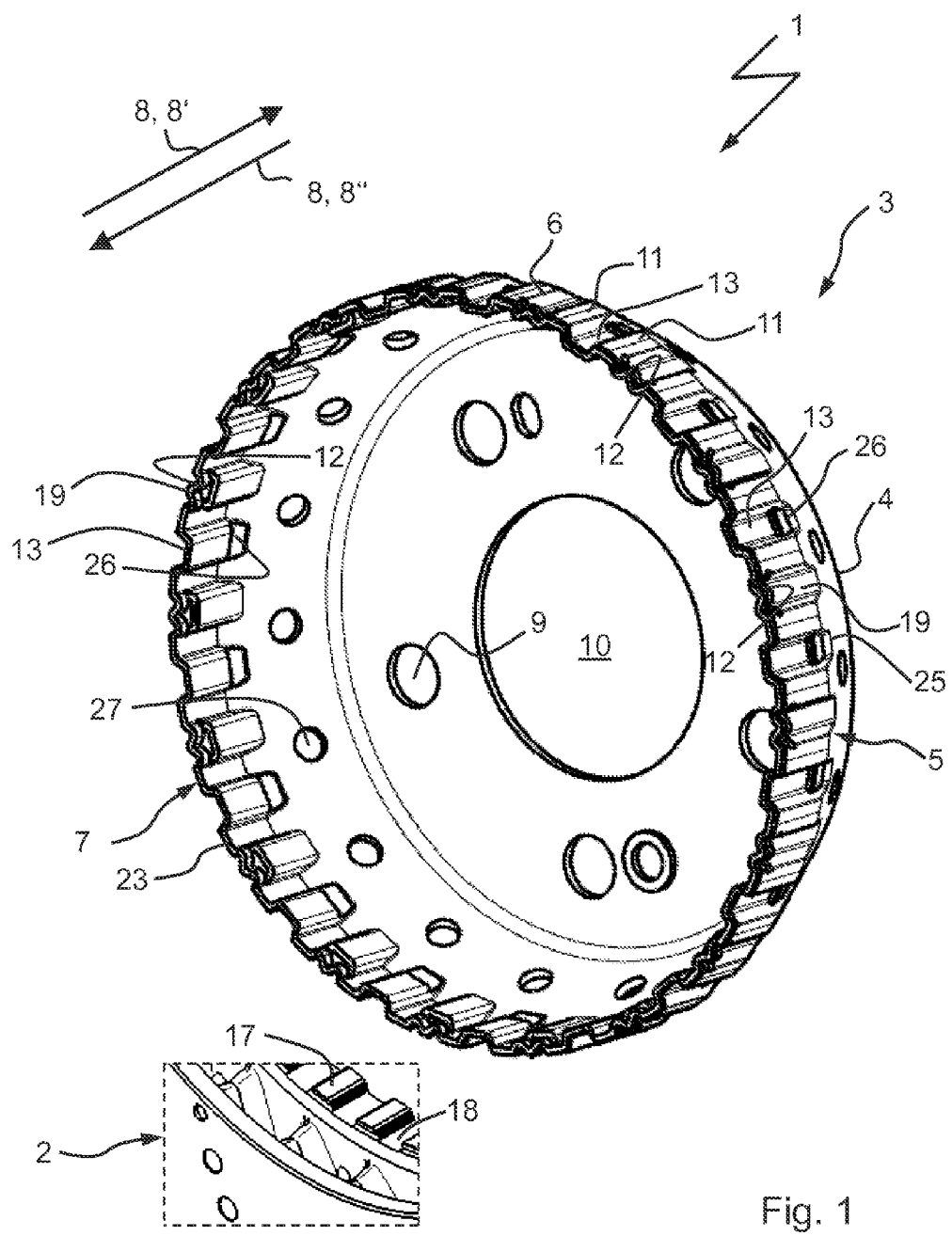

| | | | |
|---|---|---|---|
| 6,450,303 B1 | 9/2002 | Keck et al. | |
| 6,802,399 B2* | 10/2004 | Niebling et al. | 188/18 A |
| 6,910,556 B1* | 6/2005 | Baumgartner et al. | 188/218 XL |
| 7,261,193 B2* | 8/2007 | Gripemark et al. | 188/218 XL |
| 7,410,036 B2* | 8/2008 | Wimmer et al. | 188/218 XL |
| 8,418,817 B2* | 4/2013 | Visca et al. | 188/218 XL |
| 8,651,247 B2* | 2/2014 | Burgoon et al. | 188/218 XL |
| 8,739,946 B2* | 6/2014 | Pahle et al. | 188/218 XL |
| 2004/0178030 A1* | 9/2004 | Pacchiana et al. | 188/218 XL |
| 2007/0284200 A1* | 12/2007 | Hampton | 188/218 XL |
| 2008/0156298 A1* | 7/2008 | Brauneis et al. | 123/470 |
| 2012/0085603 A1* | 4/2012 | Mayer et al. | 188/218 XL |

FOREIGN PATENT DOCUMENTS

| | | |
|---|---|---|
| DE | 44 19 757 A1 | 12/1995 |
| DE | 44 20 758 A1 | 12/1995 |
| DE | 198 30669 A1 | 1/2000 |
| DE | 103 58 088 A1 | 7/2005 |
| DE | 10 2009 012 216 A1 | 9/2010 |
| DE | 10 2009 012 217 A1 | 9/2010 |
| DE | 102010004855 A1 * | 7/2011 |
| GB | 1 298 811 | 12/1972 |
| GB | 2145787 A * | 4/1985 |
| JP | 53-1436 B1 | 1/1978 |
| JP | 2002-520549 A | 7/2002 |
| JP | 2002-372072 A | 12/2002 |
| JP | 2004-116600 A | 4/2004 |
| WO | WO 2010/102704 A1 | 9/2010 |
| WO | WO 2011/085749 A1 | 7/2011 |
| WO | WO 2012/003908 A1 | 1/2012 |

OTHER PUBLICATIONS

German-language Written Opinion (PCT/ISA/237) dated Jan. 7, 2013 (5 pages).

Japanese Notification of Reason for Refusal dated Mar. 24, 2015, with partial English translation (Five (5) pages).

Chinese Office Action issued in Chinese counterpart application No. 201280050701.5 dated Jun. 21, 2016, with partial English translation (Eleven (11) pages).

* cited by examiner

BRAKE DISC

BACKGROUND AND SUMMARY OF THE INVENTION

Exemplary embodiments of the present invention relate to a brake disc having a pot and a friction ring. In addition, the invention relates to a pot and a friction ring for such a brake disc, as well as a method for the production of such a brake disc.

A brake disc is typically a component of a braking assembly for braking a vehicle wheel, in particular of a motor vehicle. The brake disc comprises a friction ring and a pot, wherein the pot is arranged concentrically in an opening of the friction ring. The connection between a hub of a wheel carrier of a wheel suspension and the brake disc is carried out by means of the pot, while the braking process is typically carried out by means of brake shoes of the braking assembly that interact with the friction ring. To transfer the respective torsional moment, the pot and the friction ring engage with each other via a gearing system, for example. An axial securing of the friction ring on the pot is also necessary to secure the brake disc against axial displacements of the pot relative to the friction ring, which can be caused by lateral forces acting on the vehicle.

German patent document DE 44 19 757 discloses a brake disc having radial stampings on the pot, which support the pot against the friction ring and thus secure it axially. It is hereby disadvantageous for an increased radial space requirement to arise. In addition, this brake disc requires increased cooling complexity.

Another brake disc is known from German patent document DE 20 13 535, which has projections along an edge of the pot, the projections engaging with slots in the friction ring. However, the slots reduce the transferability of the torsional moment between the pot and the friction ring.

A further brake disc is known from German patent document DE 26 41 443, where the pot has longitudinal grooves, with which the friction ring engages in order to guarantee the radial securing. However, the friction ring and the pot remain axially displaceable. Furthermore, this brake disc, as a result of the longitudinal grooves, has a low thermal flexibility of the friction ring and the pot, in particular during thermal expansion.

Further brake discs are known from German patent documents DE 44 20 758 and DE 198 30 669, wherein the pot and the friction ring each have a gearing system that engages with the other in order to guarantee radial securing, while projections or stampings of the friction ring and/or the pot guarantee axial securing.

The present invention is directed to an improved, or at least alternative, embodiment for a brake disc having improved axial security and a high level of transferability of a torsional moment between the friction ring and the pot of the brake disc.

In accordance with exemplary embodiments of the present invention at least one pot tooth space of a pot of a brake disc is equipped with a flap radially overlapping a corresponding annular tooth of a friction ring of the brake disc on at least one axial end. The annular tooth is a component of an annular gearing system running along an inner periphery of the friction ring, which has an opening. The pot has a floor and a wall that encloses it and protrudes from it, into which wall the opening is introduced in such a way that the pot and the friction ring have a concentric arrangement. The pot tooth space is a component of a pot gearing system running along an outer periphery of the wall and has pot teeth that are each separated from one another by such a pot tooth space. The pot gearing system and the annular gearing system run annularly in a closed manner. Its teeth hereby extend in the axial direction, wherein the axial direction relates to a rotational direction of the brake disc and thus to the axial direction of the brake disc. Accordingly, the radial direction relates to the direction running perpendicular to the axial direction. The pot gearing system is formed by the pot teeth, which protrude radially outwards, and the pot tooth spaces, while the annular gearing system is formed by the annular teeth that protrude radially inwards and are separated from one another by respective annular tooth gaps. The pot gearing system and the annular gearing system are, in addition, designed to complement each other, such that the pot teeth engage with the annular tooth gaps and the annular teeth engage with the annular tooth gaps radially. Anti-rotation between the pot and the friction ring is hereby guaranteed, with which a torsional moment between the pot and the friction ring can be transferred.

According to exemplary embodiments of the present invention, the pot or the pot gearing system has at least one first pot tooth space on which the flap is molded. The flap protrudes radially outwards and can be in contact with the annular tooth that engages with the corresponding pot tooth space. In order to guarantee an axial securing of the pot relative to the friction ring, the flap ends radially overlap the corresponding annular tooth at its axial end. An axial end is the axial end of the respective annular tooth that faces the pot floor or faces away from the pot floor. An embodiment is preferred in which the flap overlaps the corresponding annular tooth on a first axial end. Due to axial securing that is guaranteed in this way, additional stampings and recesses in or on the pot or friction ring can be dispensed with. This has the consequence that the brake disc requires a reduced amount of space, in particular in the radial direction, to guarantee the axial securing and that the expansion of the brake disc in the radial direction can be reduced. In addition, the brake disc enables simplified cooling as a result of the space-saving design.

The flap that protrudes radially outwards is, for example, curved radially outwards. The curvature is preferably designed in such a way or a radius of curvature of the flap is selected in such a way that the flap does not exceed an external diameter or a perimeter of the pot or the wall. In addition, the flap and the corresponding first pot tooth space are preferably designed in such a way that the radius of curvature of the flap is greater than 2.5 mm. The flap can in particular be formed in a W shape from an axial perspective by the radial curvature.

An embodiment is preferred in which the pot gearing system has a closed shape and runs along the entire peripheral direction of the outer periphery of the wall. The complementarily designed annular gearing system also advantageously has a closed shape and runs along the entire peripheral direction of the inner periphery of the friction ring.

In a preferred embodiment, the annular tooth, which is radially overlapped by the flap, has an axial recess on its end that is overlapped by the flap, i.e. preferably on its first axial end. The flap is, in addition, formed or shaped in such a way that it engages with this recess axially. Due to the axial engagement of the flap with the axial recess of the corresponding annular tooth, a positive axial securing of the friction ring with respect to the pot is guaranteed. Embodiments are also conceivable in which the pot tooth has such axial recesses on both axial ends. As a consequence, two flaps can then be provided, which overlap both axial ends radially and engage axially with the respective recess. However, an embodiment is preferred in which this is only carried out on the first axial end. In addition, all annular teeth can have such an axial recess on this axial end, such that, during assembly, no attention has to be paid to the allocation of the annular teeth with respect to pot tooth spaces with flaps, provided that all annular teeth are designed to be the same.

According to a further preferred embodiment, the pot gearing system has at least one second pot tooth space, on which a projection is formed. The projection of the second pot tooth space protrudes radially outwards and overlaps the annular tooth, which engages with this pot tooth space, on one of its axial ends. The projection is arranged accordingly on this axial end of the second pot tooth space. Here, an embodiment is preferred in which the flap overlaps the corresponding annular tooth on the first axial end, while the projection overlaps the corresponding annular tooth on the second axial end. This means, for example, that, whereas the flap radially overlaps the corresponding annular tooth on its axial end facing the floor of the pot and, if necessary, engages axially with the axial recess, the projection overlaps the annular tooth, with which the corresponding second pot tooth space engages, on the axial end facing away from the floor. The flap thus guarantees the axial securing into an axial direction, while the projection guarantees the axial securing into the other, opposite axial direction. In addition, the projection is preferably designed in such a way that its radial expansion does not exceed the perimeter of the pot or the wall.

Here, an embodiment is preferred in which the first pot tooth space, with corresponding flaps, and second pot tooth spaces, with corresponding projections, are arranged in an alternating manner along the peripheral direction between respectively adjacent pot teeth. Thus, a consistent securing in both axial directions is particularly guaranteed. In addition, the first pot tooth spaces, as well as the flaps, and the second pot tooth spaces enable improved thermal flexibility of the pot and the friction ring. This means that an improved adaptation is provided, in particular during thermal expansion of the pot and/or the friction ring.

In an advantageous development of the solution according to the invention, the wall has a conical shape. The wall has, for example, a smaller external diameter on the end facing the pot floor than on the end facing away from the pot floor. Alternatively or additionally, the wall is designed in such a way that it has an axial section with a conical shape. A wall designed in this manner leads to an additional axial security, with which a tendency for displacement of the friction ring relative to the pot in the corresponding axial direction is prevented or at least reduced.

It should be noted that a pot for a brake disc according to the invention, which has at least one pot tooth space with a projection and/or at least one pot tooth space with a flap that has been cut free, which has not yet been molded, i.e. has not been radially deformed, also belongs as such to the scope of this invention.

It should furthermore be noted that a friction ring for a brake disc according to the invention, which has at least one annular tooth that has the axial recess on at least one first end, preferably on its first axial end, also belongs as such to the scope of this invention.

The brake disc can now be produced according to an advantageous use of the friction ring or the pot in accordance with the method described below.

Firstly, the pot is introduced into the opening of the friction ring in such a way that a respective annular tooth and a pot tooth space, as well as an annular tooth and an annular tooth gap, engage with one another. Thus, the concentric arrangement of the pot and the friction ring is also provided. Then the respective flap of the first pot tooth space is radially deformed outwards until the respective flap radially overlaps the respective annular tooth on the respective axial end and thereby secures it in the respective pot tooth space. Embodiments are also conceivable in which the flap is already formed before the mentioned deformation in the corresponding pot tooth space, e.g. by cutting free a section of the pot tooth space that forms the flap. The radial deformation preferably takes place by caulking, such that a reinforced connection between the pot and the friction ring is particularly provided.

According to a preferred embodiment, the respective flap is then axially deformed or pressed into the recess of the annular tooth, at the region that radially overlaps the respective axial end of the corresponding annular tooth, the recess being molded on the corresponding axial end of the annular tooth. Thus, a positive axial securing is provided.

Here, embodiments are preferred in which the respective deformation of the flap, which is caused by caulking and/or imprinting, takes place in a plastic/elastic manner. The deformation of this type in particular guarantees increased resilience of the brake disc.

The caulking of the flap in the respective method steps can take place in a force-controlled and/or route-controlled manner. The deformation thus takes place until a pre-determined shape of the flap has been achieved and/or until a pre-determined force is expended.

In the course of the method, the projections of the second pot tooth spaces can additionally be exposed. The exposure of the projections can thus take place in a separate, in particular preceding, method step, or run at the same time as one of the other method steps that has already been mentioned.

Further important features and advantages of the invention arise from the sub-claims, the figures and the corresponding description of the figures, using the drawings.

It is understood that the features that are cited above and are still to be illustrated below can not only be used in the respectively specified combination, but also in other combinations or individually, without exceeding the scope of the present invention.

BRIEF DESCRIPTION OF THE DRAWING FIGURES

Preferred exemplary embodiments of the invention are depicted in the figures and illustrated in greater detail in the description below, wherein the same reference numerals refer to the same or similar or functionally identical components.

Figure 2:
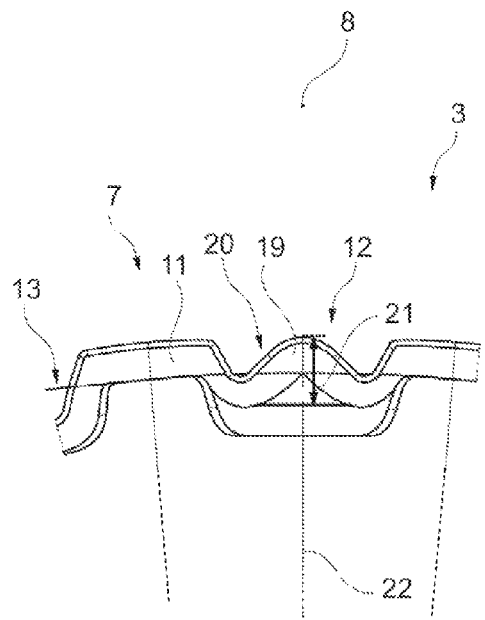
Figure 3:
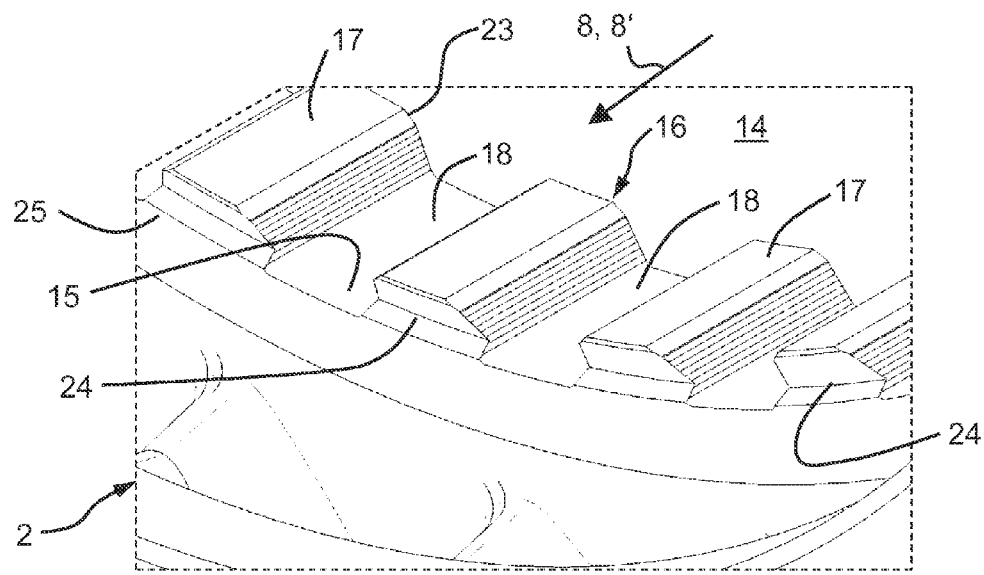

Here, schematic views of the following are depicted:

FIG. 1 an exploded diagram of a brake disc,
FIG. 2 a section through a pot,
FIG. 3 an isometric view of a friction ring.

DETAILED DESCRIPTION

Accordingly, FIG. 1 has a brake disc 1, a friction ring 2 shown sectionally and a pot 3. The pot 3 comprises a floor 4 as well as a wall 5 that projects from the floor 4 and runs in the peripheral direction. In addition, a pot gearing system 7 is molded on an outer periphery 6 of the wall 5, wherein the pot gearing system 7 is configured as an axial gearing system and extends along the entire peripheral direction. The axial direction is denoted by arrows 8 and runs parallel to an axis of rotation of the brake disc 1. In addition, the floor 4 has screw holes 9, through which the pot 3 or the brake disc 1 can be fastened to a hub of a wheel carrier of a wheel suspension of a vehicle. Furthermore, the floor 4 has a central opening 10, which is arranged in the center of the pot floor 4 and serves, for example, to center the brake disc 1 on the hub. The pot gearing system 7 is formed by pot teeth 11 that protrude radially outwards, which are each spaced apart from one another by pot tooth spaces 12, 13 along the peripheral direction, wherein the pot teeth 11 have the same shape and size.

FIG. 3 shows the friction ring 2, which has a centrally-arranged opening 14. Thus, the friction ring 2 comprises the inner periphery 15 that encloses the opening 14, on which an annular gearing system 16 of the friction ring 2 is formed. The annular gearing system 16 is configured as an axial gearing system and comprises annular teeth 17 projecting radially inwards, which are each spaced apart from one another by an annular tooth gap 18 in the peripheral direction. The annular teeth 17 and the annular tooth gaps 18 each have the same shape and size. The pot gearing system 7 and the annular gearing system 16 are, in addition, designed to complement each other, such that a respective pot tooth 11 engages with an annular tooth gap 18 and an annular tooth 17 engages with a pot tooth space 12, 13. Anti-rotation is guaranteed by this engagement between the pot gearing system 7 and the annular gearing system 16, the anti-rotation enabling a transfer of a torsional moment between the pot 3 and the friction ring 2.

As can be seen in FIGS. 1 and 2, the pot gearing system 7 has first pot tooth spaces 12, on which a flap 19 is molded. The flaps 19 of the pot tooth spaces 12 are formed by end sections 20 of the respective pot tooth space 12, the end sections being cut free, with these pot tooth spaces being formed from the remaining contour of the respective pot tooth space 12. The respective flap 19 is curved radially outwards, wherein a radius of curvature 21 of the curved flap 19 is selected in such a way that the flap 19 that curves radially outwards does not exceed an external radius 22 of the wall 5. Due to the curvature, the respective flap 19 is designed to be W-shaped when viewed axially, as in FIG. 2. The flap 19 that curves radially outwards is additionally formed in such a way that it radially overlaps the annular tooth 17, with which the corresponding pot tooth space 12 is in engagement, on a first axial end 23 that is facing away from the floor 4. The respective annular tooth 17 possesses, in the example shown, a recess 24 running axially in the peripheral direction on its first axial end 23, with which recess the flap 19 additionally axially engages. Thus, axial securing of the pot 3 relative to the friction ring 2 along a first axial direction 8' is guaranteed. In order to guarantee the axial securing in the other axial direction 8" as well, the pot gearing system 7 has second pot tooth spaces 13, which each comprise a projection 26 protruding radially outwards, which is arranged on a second axial end 25 of the respective second pot tooth space 13, with the end facing the floor 4. The respective projection 26 radially overlaps the annular tooth 17, which is in engagement with the corresponding pot tooth space 13, on the second axial end. With this, axial securing is also ensured in the second axial direction 8". For the assembly of pot 3 and friction ring 2, the exposed projections 26 serve as an axial stop, while the subsequently exposed flaps 19 cause the axial securing.

To enable or simplify cooling of the brake disc 1, cooling openings 27 are provided on the wall 5 between the pot gearing system 7 and the floor 4. The cooling openings 27 are hereby distributed consistently along the peripheral direction of the wall 5 and can serve to supply air, for example, to cool the brake disc 1.

It is understood that the first radial end 23 and the second radial end 25, as well as the corresponding overlaps of the flaps 19 or the projections 26, can be exchanged. This means that the first axial end 23 can face the floor 4, while the second radial end 25 faces away from the floor.

The brake disc 1 can thus be produced in such a way that first the pot 3, in which the flaps 19 are still not deformed, is inserted into the opening 14 of the friction ring 2, such that the pot 3 and the friction ring 2 are arranged concentrically and a respective pot tooth 11 engages with an annular tooth space 18, while an annular tooth 17 engages with a pot tooth space 12, 13. The projections 26 of the second pot tooth spaces 13 guarantee a corresponding axial arrangement of the pot 3 and the friction ring 2 and serve as an axial stop. Then the respective flap 19 is radially deformed, wherein this deformation preferably takes place by caulking the flap 19. The radial deformation of the flap 19 is carried out in such a way that the respective flap 19 overlaps the corresponding annular tooth 17 on at least one axial end 23, 25, here on the first axial end 23. At the same time, the region overlapping the annular tooth 17 of the respective flap 19, which is deformed radially outwardly, is impressed axially into the corresponding recess 24 on the second axial end 25 of the annular tooth 17. Thus, the friction ring 2 is secured relative to the pot 3 in both axial directions 8', 8".

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle brake disc, comprising:
 a pot with a floor and a wall protruding from and enclosing the floor; and
 a friction ring having an opening in which the pot wall is arranged,
 wherein the pot and the friction ring are arranged concentrically,
 wherein the pot wall has an axial pot gearing system running along an outer periphery, the axial pot gearing system having pot teeth protruding radially outwards,
 wherein a respective pot tooth space of the axial pot gearing system is arranged in a peripheral direction between adjacent pot teeth,
 wherein the friction ring has an axial annular gearing system running along an inner periphery, the axial gearing system of the friction ring is configured to complement the pot gearing system and has annular teeth protruding radially inwards,
 wherein a respective annular tooth gap of the axial gearing system of the friction ring is arranged in the peripheral direction between adjacent annular teeth,
 wherein the pot teeth engage with the annular tooth gaps of the axial gearing system of the friction ring,
 wherein the annular teeth of the axial annular gearing system of the friction ring engage with the pot tooth spaces of the axial pot gearing system,
 wherein a flap is molded on at least one first pot tooth space of the axial pot gearing system, the flap protruding radially outwards and radially overlapping a respective annular tooth of the friction ring, which engages with the at least one first pot tooth space, on a first axial end of the respective annular tooth of the friction ring, wherein the annular tooth of the friction ring overlapped by the flap at the first axial end of the annular tooth of the friction ring has an axial recess, with which the flap axially engages.

2. The motor vehicle brake disc of claim 1, wherein a projection is molded on at least one second pot tooth space of the axial pot gearing system, the projection protruding radially outwards and radially overlapping the respective annular tooth of the friction ring, which engages with the at least one second pot tooth space, on a second axial end of the friction ring.

3. The motor vehicle brake disc of claim 2, wherein first pot tooth spaces and second pot tooth spaces are arranged along the peripheral direction in an alternating manner between respectively adjacent pot teeth.

4. The motor vehicle brake disc of claim 1, wherein the wall has a conical shape or an axial section with a conical shape.

5. A method for the production of a brake disc having a pot with a floor and a wall protruding from and enclosing the floor, and a friction ring having an opening in which the pot wall is arranged, wherein the pot and the friction ring are arranged concentrically, wherein the pot wall has an axial pot gearing system running along an outer periphery, the axial pot gearing system having pot teeth protruding radially outwards, wherein a respective pot tooth space of the axial pot gearing system is arranged in a peripheral direction between adjacent pot teeth, wherein the friction ring has an axial annular gearing system running along an inner periphery, the axial gearing system of the friction ring is configured to complement the pot gearing system and has annular teeth protruding radially inwards, wherein a respective annular tooth gap of the axial gearing system of the friction ring is arranged in the peripheral direction between adjacent annular teeth, wherein the pot teeth engage with the annular tooth gaps of the axial gearing system of the friction ring, wherein the annular teeth of the axial annular gearing system of the friction ring engage with the pot tooth spaces of the axial pot gearing system, wherein a flap is molded on at least one first pot tooth space of the axial pot gearing system, the flap protruding radially outwards and radially overlapping a respective annular tooth of the friction ring, which engages with the at least one first pot tooth space, on a first axial end of the respective annular tooth of the friction ring, wherein the pot is inserted into the opening of the friction ring in such a way that a respective pot tooth space and an annular tooth, as well as an annular tooth gap and a pot tooth, engage with one another, the respective flap of the first pot tooth space is radially deformed in the direction of the corresponding first annular tooth at least in certain regions by caulking or imprinting, and wherein the respective flap is impressed axially into a recess of the corresponding annular tooth.

6. The method of claim 5, wherein a plastic or elastic deformation takes place during the respective caulking or imprinting.

* * * * *